April 21, 1953 R. J. MENNE 2,635,887
STAIR CLIMBER TYPE OF HAND TRUCK
Filed June 8, 1949 2 SHEETS—SHEET 1
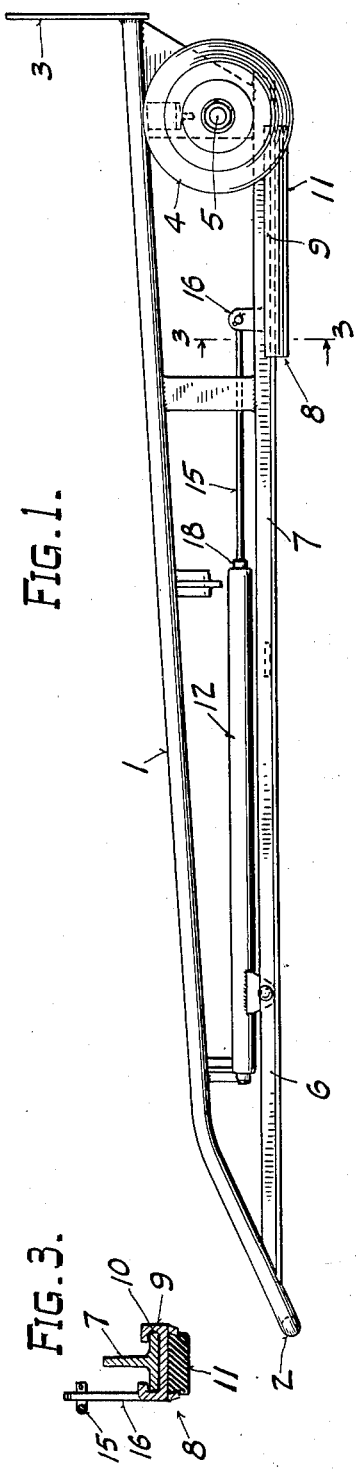
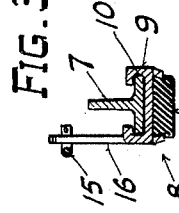
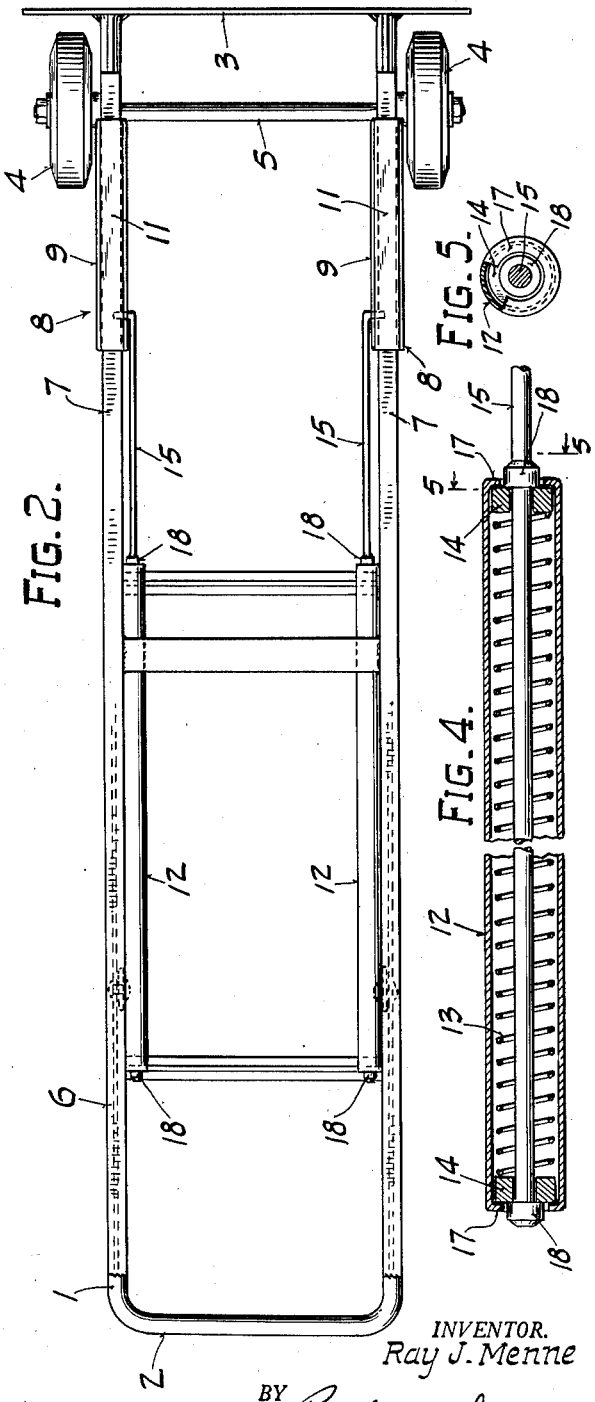
INVENTOR.
Ray J. Menne
BY Andrus & Sceales
ATTORNEYS.

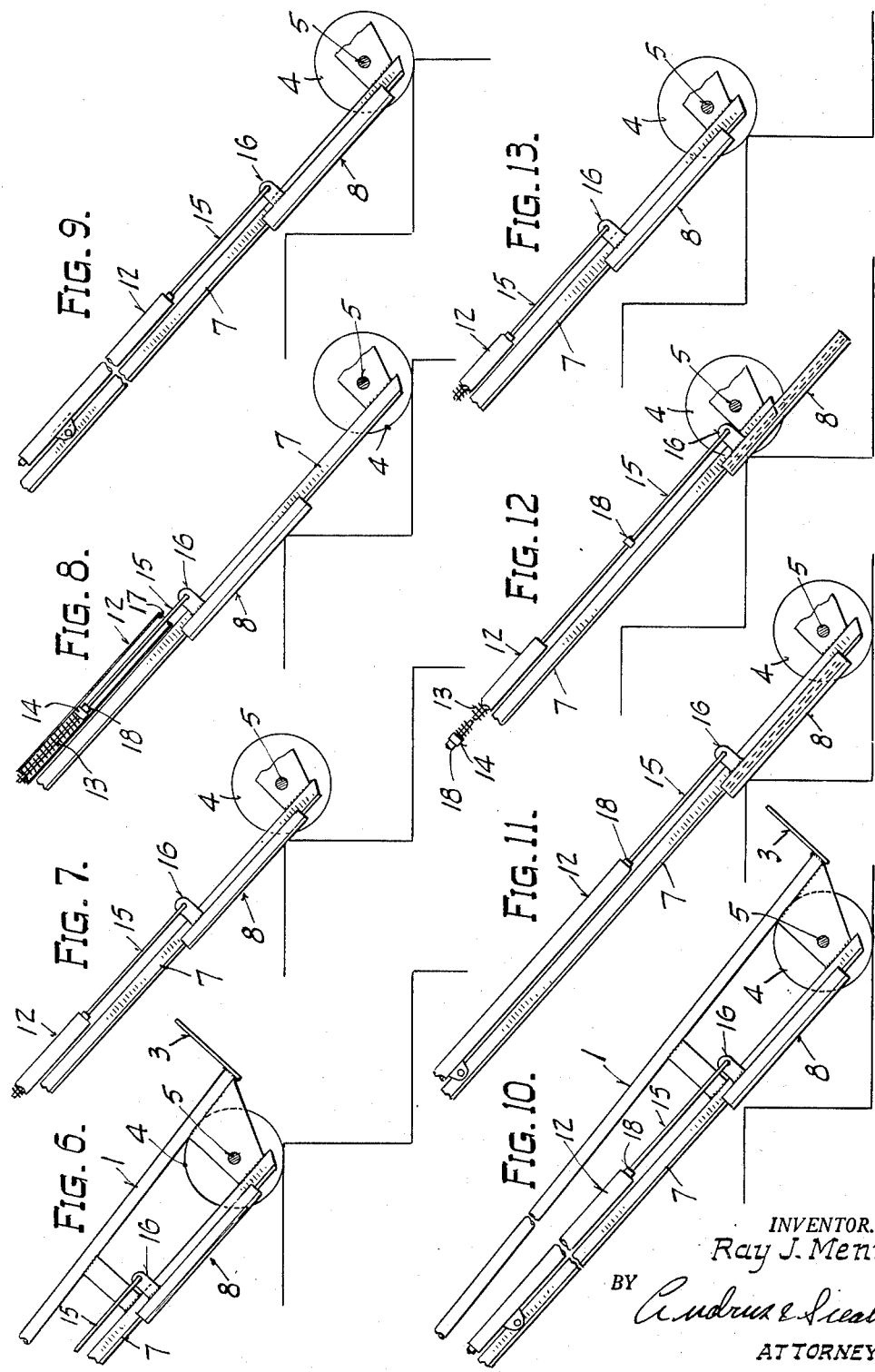

Patented Apr. 21, 1953

2,635,887

UNITED STATES PATENT OFFICE 2,635,887

STAIR CLIMBER TYPE OF HAND TRUCK

Ray J. Menne, East Troy, Wis.

Application June 8, 1949, Serial No. 97,733

1 Claim. (Cl. 280—5.24)

This invention relates to hand trucks and particularly to track-laying means adapting such trucks for travel up and down stairways.

The invention provides a tread adjacent each wheel of the truck which is disposed to receive and support the weight of the truck as the wheels pass over a step. The truck is adapted to slide on the treads until the wheels reach the next step and momentarily relieve the treads which are automatically then repositioned to engage the next step.

A principal object of the invention is to provide a hand truck which will traverse stairways more easily.

A more particular object is to eliminate the need of endless tracks or treads which are cumbersome and inefficient.

A further object is to provide a rigid tread for the hand truck which will support the load on the edge of the steps anywhere along its length without collapse or strain.

Another object is to provide for the more smooth travel of the truck on the tread and with less effort required to overcome friction.

Another object is to reposition the treads without variation automatically and positively as the truck traverses the stairs.

Another object is to reposition the treads rapidly and accurately as the truck traverses a series of steps without noise or vibration.

Another object is to provide a less expensive track-laying device which may be easily fitted on any hand truck to adapt the same for travel up and down stairs.

These and other objects and advantages will be more fully set forth in the following description of a preferred embodiment of the invention as illustrated in the accompanying drawings.

In the drawings:

Figure 1 is a side elevation of a two-wheeled hand truck equipped with treads for traversing a stairway;

Fig. 2 is a bottom plan view of the truck shown in Fig. 1;

Fig. 3 is a sectional view taken on line 3—3 of Fig. 1 through a tread;

Fig. 4 is a longitudinal section taken through the spring unit for repositioning the treads;

Fig. 5 is a transverse section taken on line 5—5 of Fig. 4;

Figs. 6, 7, 8 and 9 are diagrammatic views showing the operation of the truck in descending a stairway; and Figs. 10, 11, 12 and 13 are diagrammatic views showing the operation of the truck in ascending a stairway.

The hand truck shown in the drawings comprises the tubular frame 1 providing the handle 2 at the upper end, and the base plate 3 at the lower end of the truck adapted to engage the bottom of a load, not shown, as the same is supported on its side on frame 1. The wheels 4 carried on the axle 5 at the lower end of the truck provide for travel of the truck over relatively flat concourses.

The structural framework 6 on the underside of frame 1 serves to reinforce the latter and includes the parallel rails 7 of T-section. The lower end of each rail 7 is disposed adjacent the inside of a corresponding wheel 4 and the rail extends upwardly along frame 1 from beneath axle 5.

The treads 8 for travel up and down stairways, as will be described, comprise the slide shoes 9 which are formed lengthwise to provide the slots 10 to adapt the treads to be slidably secured on rails 7 and the rubber tires 11 secured to the underside of each shoe 9 to protect the stairways.

The cylinder 12 secured to each rail 7 at the upper end of the truck encloses the spring 13 disposed between end washers 14. The operating rod 15 is secured to the lug 16 of the corresponding tread 8 carried by rail 7 and slidably extends through washers 14 and spring 13 within cylinder 12.

The ends 17 of cylinder 12 are partially closed to retain washers 14 and spring 13 under compression within the cylinder but to allow the stops 18 carried by rod 15 to pass therethrough.

Stops 18 on rod 15 normally engage respectively opposite washers 14 so that spring 13 biasing the washers against the ends 17 of cylinder 12 normally and positively positions rod 15 and the tread 8 connected thereto.

Upon movement of treads 8, as will be described, in either direction, a corresponding stop 18 engages the respective washer 14 to compress spring 13 in the same direction against the other washer through which the rod is adapted to slide. Upon release of tread 8, spring 13 expands to the full length of cylinder 12 to reposition rod 15 and the tread, as described.

In using the truck, the load, not shown, is most easily carried with the truck tilted to balance the load over wheels 4.

In approaching a stairway going down, the truck wheels 4 are driven over the top step, as shown in Fig. 6, and the truck lowers onto the treads 8 which then engage the edge of the step, as shown in Fig. 7. The truck is then lowered with rails 7 sliding in slots 10 of treads 8 until wheels 4 contact the first lower step, as in Fig. 8.

As wheels 4 ride momentarily on the first lower step the treads 8 are relieved of the load and repositioned by spring 13 through rod 15 as described above and as shown in Fig. 9. As wheels 4 ride over each step the truck is thus alternately carried by the treads 8 and wheels 4 until the bottom of the stairway is reached.

In approaching a stairway going up, the truck is turned so that both treads 8 engage the first step, as shown in Figs. 10 and 11. With rails 7 sliding upwardly in slots 10 of treads 8, the truck is lifted until wheels 4 reach the first step, as shown in Fig. 12.

As the wheels 4 engage the first step the truck load is removed from the treads 8 which thereupon are repositioned immediately by springs 13, as shown in Fig. 13.

As will be understood from the foregoing, the position of treads 8 with respect to wheels 4 is best determined with regard to the load which the truck is designed to carry. The wheels should project sufficiently beyond the base plane of treads 8 to relieve fully the truck load upon the treads 8 for repositioning the treads with each step that is traversed. The treads 8 in their normal position should extend high enough to engage the edge of the first step of a stairway in going up and should be provided by spring 13 with an operating distance on rails 7 sufficient to allow the truck to traverse the full distance between steps, as described.

By reason of the double action of springs 13, the springs serve to absorb the recoil of treads 8 as they are returned by the springs to their normal positions on rails 7 each time to engage the next step.

Rails 7 and the slots 10 of the treads require nominal lubrication for operation of the truck with a minimum of frictional resistance to travel.

The truck may be easily poised by the operators on any step of the stairway, as desired, along the way for their accommodation.

The complete operating unit including rails, treads and spring positioning means are light in weight and easily manufactured and may comprise a unit to be attached to an ordinary hand truck of the class described.

Trucks having more than two wheels may be equipped with a tread unit adjacent each wheel and will traverse stairways in a similar manner.

These and various other embodiments of the invention may be employed within the scope of the accompanying claim.

I claim:

A hand truck of the class described comprising a tubular frame with a pair of side bars and a lift platform at one end, a pair of wheels disposed adjacent the side bars and behind the platform to support the same, a handle depressed from the plane of the side bars and formed by a cross member therefor at the end opposite said lift platform, a pair of fixed side rails extending beneath said side bars in spaced relation thereto from a position adjacent to said wheels to the corresponding ends of the handle cross member, a shoe mounted on each rail to travel in either direction thereon and normally disposed just behind the wheel tread position and extending upwardly therefrom along the rail toward the handle, said shoes being adapted to take the load of the truck from the wheels when traveling up or down a stair step and after or before the wheels contact the edge of the step, a pair of long cylindrical spring housings each carried by a bracket pivoted to the respective side rail near the handle, a coil compression spring in each said housing, a rod passing axially through the housing and spring and connected at its lower end to the corresponding shoe to reciprocate therewith, abutment washers on each said rod and confined in the corresponding housing for compressing the spring from either end corresponding to the direction of movement of the rod therethrough, and abutments on each said rod disposed to engage the corresponding washers and to hold the corresponding shoe in normal position when said spring is generally extended in said housing.

RAY J. MENNE.

References Cited in the file of this patent

UNITED STATES PATENTS

| Number | Name | Date |
|---|---|---|
| 2,263,879 | Jorgensen | Nov. 25, 1941 |
| 2,459,275 | Gates | Jan. 18, 1949 |
| 2,467,644 | Wright et al. | Apr. 19, 1949 |